UNITED STATES PATENT OFFICE

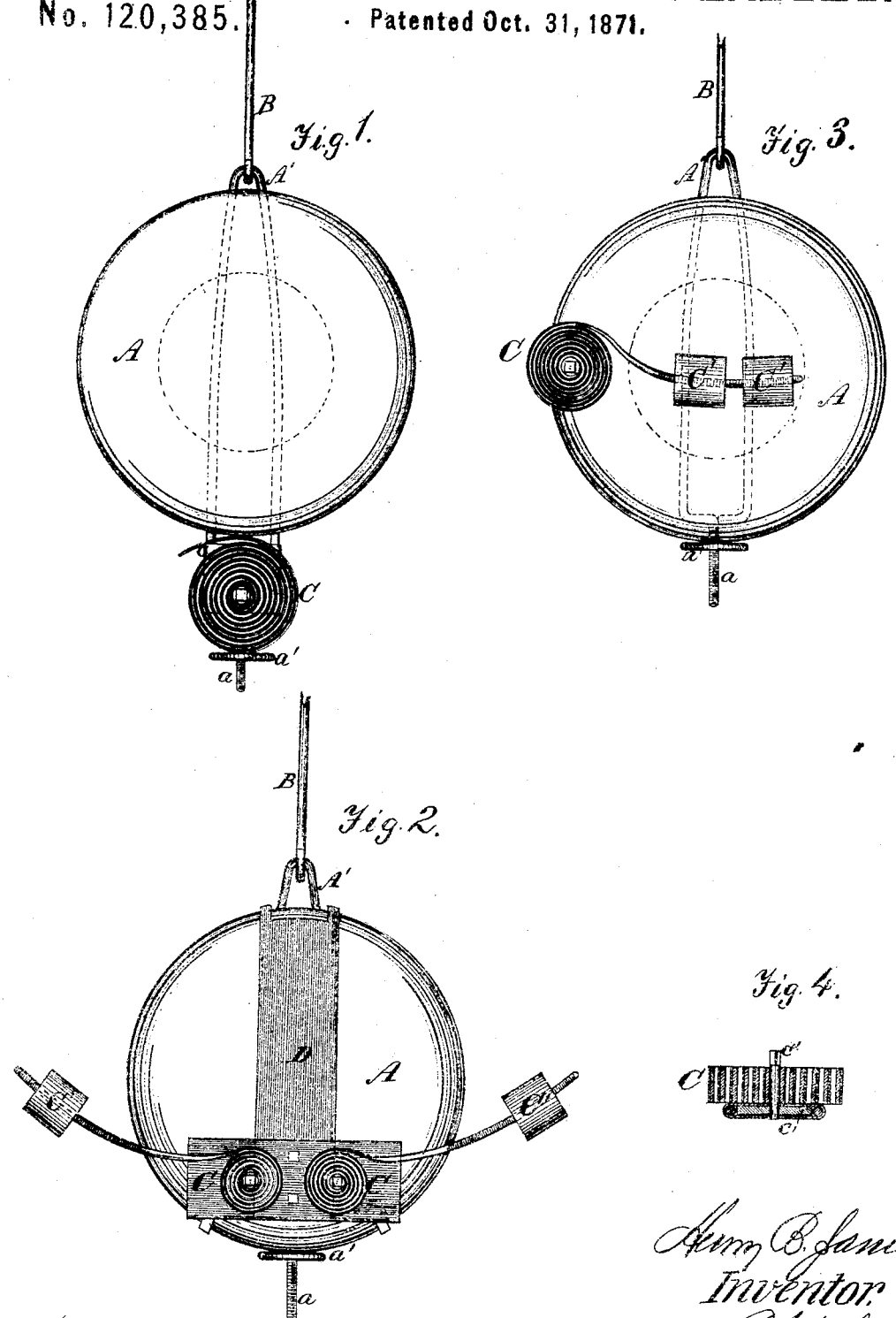

HENRY B. JAMES, OF TRENTON, NEW JERSEY.

IMPROVEMENT IN COMPENSATION-PENDULUMS.

Specification forming part of Letters Patent No. 120,385, dated October 31, 1871; antedated October 27, 1871.

*To all whom it may concern:*

Be it known that I, HENRY B. JAMES, of Trenton, in the county of Mercer and State of New Jersey, have invented certain Improvements in Compensation-Pendulums; and I do hereby declare that the following is a full, clear, and exact description thereof, reference being had to the annexed drawing making a part of this specification, in which—

Figure 1 is a front view of a pendulum embodying my improvement. Fig. 2 is a horizontal section through the compensating-coil and its supports. Fig. 3 represents a modification in the construction of the compensator and its application. Fig. 4 represents another modification thereof.

The same letters of reference are used in all the figures in the designation of identical parts.

This invention relates to clock-pendulums of that class which is provided with means to compensate for the variations in the length of the pendulum-rod, resulting from changes of temperature, in such a manner that the center of oscillation is always maintained at the same point in the line of suspension, so that the vibrations will be equal in time. My improvement consists in the employment, in connection with the pendulum-bob, of a coil or voluted bar, composed of laminæ of two metals, differently affected by changes of temperature, which coil may be interposed between the bob and the usual regulating-nut so as to support the bob upon its outer end, and is so constructed as to cause an upward movement of the bob as the pendulum-rod lengthens, and a downward movement thereof as said rod shortens. I prefer to use one or more of such coils attached to the pendulum-bob, or to the lower end of the rod, in which case the outer end of such coil or coils is weighted and the compensation effected by the change in the position of the weight or weights when affected by changes of temperature. In some cases the weighted coil or coils may be substituted for the usual bob, and the regulating-nut is sometimes over the bob or at the top of the rod and out of the way.

To enable those skilled in the art to make and use my invention, I will proceed to describe its construction and operation.

In the annexed drawing, A represents the bob or ball of a common clock-pendulum, and A' the loop by which the bob is suspended from the pendulum-rod B, and on which it can be slid up and down. The loop passes under a bridge on the back of the bob and terminates in a screw-threaded shank, $a$, which projects below the bob and carries the ordinary adjusting-nut $a'$. The compensator C consists of a coil or voluted bar, and is attached to the loop A' between the bob and the adjusting-nut $a'$, and in such manner that it can freely move up or down thereon, so as not to interfere with the action of said adjusting-nut. To this end a cross-head $c$ is fitted on the loop, and the coil C fastened to this cross-head, preferably in the manner shown best in Fig. 2, namely, by means of a friction-pin, $c'$. The coil is constructed of laminæ of two metals, which expand and contract at a different rate under changes of temperature, the laminæ being firmly united in any well-known manner. I prefer to make it of steel and brass in about equal proportions, the latter, the most sensitive in this respect, being placed on the inside, so that when the coil lengthens by reason of an increase in temperature, its outer end, which supports the bob, will be thrown upward and, consequently, raise the bob. As the coil contracts its free outer end moves downward, followed by the bob. It is evident that as the movement from or toward the center or point of suspension of the coil under changes of temperature is greatest at its extreme outer end, from which it gradually lessens, its action upon the bob may be regulated by turning the coil to support the bob nearer to or further from its end. The inner end of the coil terminates in a collet for the reception and retention of the friction-pin. In the modification shown in Fig. 3 the coil is attached at its inner end to one side of the bob, and its free outer end is extended from it in a tangential and nearly horizontal direction past the center of the bob to receive a suitable weight or weights, C'. In Fig. 4 a pair of such weighted coils is shown, the outer ends of which point in opposite directions from their points of attachment. They are secured to a frame or plate, D, which is in turn hooked over the bob in the manner shown. In both cases the bob is supported upon the regulating-nut in the ordinary manner, and the required compensation is effected by the up or down movements of the weighted end of the coil as it expands or contracts. The weights are arranged adjustably on the coils by means of screw-threads, so that b changing their position with reference to the extreme end of the coil their vertical movement may be lessened or increased to obtain the correct result.

I am aware of the compensation-pendulum shown and described on page 340 of the 18th volume of the Bulletin de la Societé de l'Industrie Nationale, in which the compensation is effected by the action of a bent bar, composed of laminæ of two different metals and interposed between the bob and the regulating-nut. My compensator is essentially different from that one by reason of its coiled form, in consequence of which its action upon the bob can be readily and nicely regulated by simply turning it on its support to have the bob rest upon it nearer to or further from its outer end, and adjusting devices may be dispensed with.

What I claim as my invention, and desire to secure by Letters Patent, is—

1. In combination with a pendulum-bob, the convoluted or coiled compensator C composed of laminæ of two metals differently affected by changes of temperature, and arranged adjustably on its support, to operate substantially in the manner set forth.

2. The adjustable coiled compensator C, constructed as described, in combination with a weight or weights, C', carried by an extended arm thereof, substantially as set forth.

In testimony whereof I have signed my name to the foregoing specification in the presence of two subscribing witnesses.

HENRY B. JAMES.

Witnesses:
WOODBURY D. HOLT,
A. S. HOLT.

(36)